United States Patent
Kühlmann

(10) Patent No.: US 10,696,483 B2
(45) Date of Patent: Jun. 30, 2020

(54) DRIVER OF A FEED CHAIN AND FEED CHAIN

(71) Applicant: Franz Josef Kühlmann, Laer (DE)

(72) Inventor: Franz Josef Kühlmann, Laer (DE)

( * ) Notice: Subject to any disclaimer, the term of this patent is extended or adjusted under 35 U.S.C. 154(b) by 0 days.

(21) Appl. No.: 16/431,038

(22) Filed: Jun. 4, 2019

(65) Prior Publication Data

US 2019/0283971 A1    Sep. 19, 2019

Related U.S. Application Data

(63) Continuation of application No. PCT/EP2017/082232, filed on Dec. 11, 2017.

(30) Foreign Application Priority Data

Dec. 16, 2016   (DE) .................... 20 2016 107 093 U

(51) Int. Cl.
| | | |
|---|---|---|
| *B65G 19/08* | (2006.01) | |
| *B65G 17/40* | (2006.01) | |
| *B65G 19/14* | (2006.01) | |
| *A01K 39/01* | (2006.01) | |
| *A01K 5/02* | (2006.01) | |

(52) U.S. Cl.
CPC ............... *B65G 19/08* (2013.01); *A01K 5/02* (2013.01); *A01K 39/01* (2013.01); *B65G 17/40* (2013.01); *B65G 19/14* (2013.01)

(58) Field of Classification Search
CPC ........ B65G 19/22; B65G 19/24; B65G 19/08; B65G 19/14; B65G 17/40; A01K 39/01; A01K 5/02

USPC .......................................... 198/728, 731, 730
See application file for complete search history.

(56) References Cited

U.S. PATENT DOCUMENTS

| | | | |
|---|---|---|---|
| 1,048,848 A | 12/1912 | Miner | |
| 2,699,250 A | 1/1955 | Keen | |
| 4,441,605 A * | 4/1984 | Ronco | B65G 19/24 198/719 |
| 4,684,009 A * | 8/1987 | Rehbein | B65G 19/24 198/731 |
| 4,989,724 A * | 2/1991 | Komotzki | B65G 19/24 198/731 |
| 8,662,287 B2 * | 3/2014 | Fischer | B65G 19/24 198/731 |
| 9,284,124 B2 * | 3/2016 | Klingbeil | B65G 19/10 |
| 2007/0187213 A1 * | 8/2007 | Garbagnati | B65G 17/065 198/731 |
| 2011/0315519 A1 * | 12/2011 | Fischer | B65G 19/22 198/728 |

FOREIGN PATENT DOCUMENTS

DE          202016003707 U1     6/2016

* cited by examiner

Primary Examiner — James R Bidwell

(57) ABSTRACT

A driver for use on a feed chain having elongate oval chain links that have two chain link legs. The driver is wider than the width of the chain link, so as to project beyond both sides of the chain link. The driver has a snap connector that allows the driver to be snapped onto the two chain link legs. A locking bar may be used with the driver to prevent the chain link legs from inadvertently releasing from the snap connector.

13 Claims, 5 Drawing Sheets

DRIVER OF A FEED CHAIN AND FEED CHAIN

BACKGROUND INFORMATION

Field of the Invention

The invention relates to a feed chain and to a driver for such a feed chain.

Discussion of Prior Art

Feed chains are frequently used in feed systems that are designed to provide feed to a large number of animals. The feed chain runs in a feed channel that contains the feed; pushers or drivers are provided on the chain and serve to move the feed along in the channel. In this way, the chain and the drivers distribute as well as replenish a quantity of feed uniformly over the entire length of the feed channel as the chain is pulled through the channel.

For economic considerations, the conventional feed chain typically comprises chain links made of round wire that have been formed to a closed elongate oval ring, i.e., the cross-section of the chain link material is round and the link has two straight legs that extend between rounded ends. These types of chains are commercially available and used for a variety of purposes, whereby the overall dimensions of the individual links may vary, and different thicknesses of the round-wire material and different materials may be used.

It is also known in the industry to use steel angle brackets or profiles that have an approximately L-shaped cross section for the feed chain drivers. These angle profiles are selected and assembled such that a leg of the L extends transversely to the longitudinal axis of the chain, so that they push the feed along when they are pulled along the bottom of the feed channel. These types of drivers are typically welded to the chain links, which necessarily entails a costly assembly step, because welding requires the work of a trained and certified welder.

The drivers always have to be adapted to the feed chain, even if a commercially available chain is used as the feed chain, for example, a chain having the typical elongate oval chain links made of round wire, and even if the drivers are commercially available semi-finished metal angle profiles with an L-shaped cross-section. Adaptation may simply entail selecting angle profiles that have a length that ensures that the pusher part of the driver extends out beyond the width or height of the chain link in the channel, thus ensuring that the driver entrains the desired amount of feed.

U.S. Pat. No. 1,048,848 A discloses a conveyor chain that corresponds to the closest prior art. The chain is made up of the typical oval chain links formed from round wire and is fitted with drivers referred to as cleats. The cleat has a slotted mounting end that lends elasticity to two arms that extend on each side of the slot. The two arms have recesses on the faces of the arm that face away from the slot. These recesses are dimensioned to accommodate and engage with a portion of the round wire material that is used to form the chain links. The arms are pressed together to reduce the width of the slot and, thus, the overall width of the mounting end of the driver, thereby allowing the mounting end of the driver to be inserted into the chain link. Releasing the two arms allows them to snap into place on the chain link, with the recesses engaging with the round wire forming the chain link legs to hold the cleat on the link. The legs of the chain links are straight, which means that the driver will likely shift its position along the link when it begins to push feed along the feed channel.

DE 20 2016 003 707 U1 discloses a feed chain that extends lengthwise through a tube that serves as the conveyor channel. The feed chain is fitted with circular drivers that extend beyond the dimensions of the chain links, so that they fill out the greatest portion of the free, inner cross-sectional area of the tube. The driver links, i.e., the links that hold the drivers, deviate in shape from the elongate oval shape of the typical chain link. These driver links have an hour-glass shape, i.e., a narrowing of a central portion of the link legs, which serves to prevent the drivers from shifting along the chain link in the longitudinal direction. This feed chain, thus, requires special assembly that inserts a driver link at desired intervals along the chain.

What is needed, therefore, is a feed chain driver that is cost-effective to produce, simple in its construction and assembly. What is further needed is such a feed chain driver that provides a long and trouble-free service life and requires only simple and inexpensive steps to replace drivers.

BRIEF SUMMARY OF THE INVENTION

It is an object of the invention to provide a feed chain driver that is very cost-effective to produce, and that requires only simple and inexpensive assembly and maintenance. It is a further object to provide a feed chain system that includes a feed chain constructed from conventional, commercially available chain links that are easily fitted with these feed chain drivers.

The feed chain driver, referred to hereinafter simply as the driver, is constructed such that it simply snaps onto the chain link. In other words, mounting the driver on the chain link does not require a welded joint; rather, the driver is fastened to the chain link by means of a snap connector. The particular construction of the driver according to the invention provides several economic benefits:

1) Specialized personnel, such as, typically, certified welders, are not required to assemble a driver on the chain link. Assembly may be done inexpensively by trained personnel or by machine.

2) Eliminating the welding step also means eliminating the heat that is typically generated in the welding process and that is introduced into the chain link. This heat has been a problem with conventional chain links because it may lead to a structural change in the link material and result in a reduction on the strength characteristics of the material, for example, because the chain link material becomes brittle. Operating conditions on feed systems often exert additional mechanical loads, such as vibration and/or tensile forces, on the feed chain and these loads in addition to the embrittlement may lead to premature failure, i.e., breakage, of the chain links before they reach the end of their intended service life. The embrittlement and reduction in material strength that may possibly result from the welding process is not an issue with the drivers according to the invention, and consequently, a less expensive material may be used for the feed chain.

3) Replacement of or adding additional drivers to the feed chain does not require removing the chain from the feed channel. The driver is easily released from the feed chain and a new driver easily snapped into place and this can be done by the operator of the feed system.

4) Because it is such a simple matter to replace or add additional drivers, it is not necessary to have certified welders do this, or even to have to consult with the manufacturer's specialized personnel. As a result, repairs may be carried out on short notice, thereby ensuring that full functionality of the feed system is restored as quickly as possible.

The driver according to the invention has two chain-link slots that are dimensioned to accommodate the two legs of the chain link. There is some elasticity in the area around the chain-link slots, so that the driver may simply be snapped onto the legs of the chain link. This construction with two slots to snap onto the two legs of a chain link effectively prevents the driver from rotating on the link. The chain-link slots are grooves that extend in the longitudinal direction of the chain link when the driver is assembled on the link. For example, the chain-link slots are long enough that they accommodate one-third or one-half of the length of the legs.

Depending on the specific dimensions of the feed chain to be used, the driver is dimensioned such that it is prevented from shifting in directions that are vertical and/or transverse to the feed chain. In the longitudinal direction of the feed chain, however, the driver may possibly shift within the chain link itself, namely, when the legs of the chain link are straight and parallel and extend in the longitudinal direction of the chain, and when the two chain-link slots on the driver are shorter in length than legs of the chain link. The fact that the driver is not mounted so as to be immovable in the longitudinal direction on the chain link simplifies the assembly of the driver.

The two chain-link slots, together with a wall or protrusion that separates the two slots, provides the desired geometry to achieve a snap connector that enables the driver to be firmly seated on the chain link. The contour on this protrusion is mushroom shaped, i.e., it includes a stem with an umbrella-like upper portion that is wider than the stem. The stem has a hollow or groove on the two faces that face the chain-link slots. The combination of the stem and the upper portion forms an omega-shaped slot that encircles more than 180 degrees of the round wire of a chain link leg, this shape allowing the driver to be snapped onto the chain link leg and remain there until a sufficient force is applied to the driver to remove it.

Advantageously, the driver may be a molded plastic component. Many plastics, for example, polyamide or polyethylene materials, have self-lubricating properties, and this has the advantages of reducing the noise that the drivers generates when running in the feed channel and also reducing wear and thus ensuring a long service life. Furthermore, using plastic to form the driver also means that hygienically harmless, i.e., food-safe, plastics may be used. A further advantage to using plastic material is that the driver may be designed to have the elasticity that produces the desired snap connection with the chain link.

This elasticity also provides compensation for tolerances in the diameter of the round wire, which may vary from chain to chain or within a chain from chain link to link. This is a significant advantage, because, if steel is used to form the links by welding the ends together, the diameter in the area of the weld changes; the plastic material is able to compensate for these variations and still allow the driver to be securely snapped onto the chain link.

Feed systems are sometimes subject to harsh operating conditions. In order to ensure that the driver remains securely on the chain link, even under harsh conditions, a locking bar may be provided on the driver that covers the upper open portions of the chain-link slots, thereby preventing the legs of the chain link from inadvertently escaping their respective slots.

A hinge construction may be used to secure the locking bar to the driver, so that the locking bar is movable relative the driver, yet held captive on the driver. The driver and locking bar are configured so that the two parts are able to engage with each other to lock the locking bar in position.

The hinge may be designed as a film hinge, also referred to as a living hinge. Thus, if the driver is a molded plastic body, for example, is an injection-molded component, the driver and the locking bar may be integrated into a single molded component. This effectively reduces the number of parts that have to be handled when assembling the driver on the feed chain.

Alternatively, the locking bar may be provided as a separate component that is releasably secured to the driver after the driver has been snapped onto the chain link. For example, complementary contours may be provided on the appropriate sections of the driver and the locking bar that engage with each other to achieve a snap connection.

Alternative to the snap connection between driver and locking bar, it may be desirable to use a connection that is not subject to the same forces that act on the snap connector that holds the driver to the chain link. In this case, a slide connection may be used to secure the two parts together. This type of connection is able to absorb considerably larger forces than a snap connector. The direction of slide to mount the locking bar on the driver is preferably in a different direction than the direction of movement when snapping the driver onto the chain link. Thus, if the driver is snapped onto the link in a vertical direction, the direction of slide for the locking bar is preferably in a horizontal direction, for example in the longitudinal or in the transverse direction of the feed chain. Terms such as vertical, horizontal, transverse, front and back are referenced from the orientation that the feed chain later occupies in a horizontally extending feed channel.

Advantageously, the locking bar may be assembled onto the driver by pushing the locking bar from the front toward the rear against a stop that is provided on the driver. In practical use, the feed presses against the locking bar and urges the locking bar further against the stop, thereby ensuring that the locking bar is forced in the direction of the stop during normal operation and is, thus, prevented from sliding in the opposite direction on the driver body, i.e., toward the front of the driver body.

The feed chain according to the invention is a feed chain that is fitted with a plurality of drivers according to the invention. The drivers may also be manufactured and sold individually, i.e., as elements separate from the feed chain.

BRIEF DESCRIPTION OF THE DRAWINGS

The present invention is described with reference to the accompanying drawings. In the drawings, like reference numbers indicate identical or functionally similar elements.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

Figure 1:
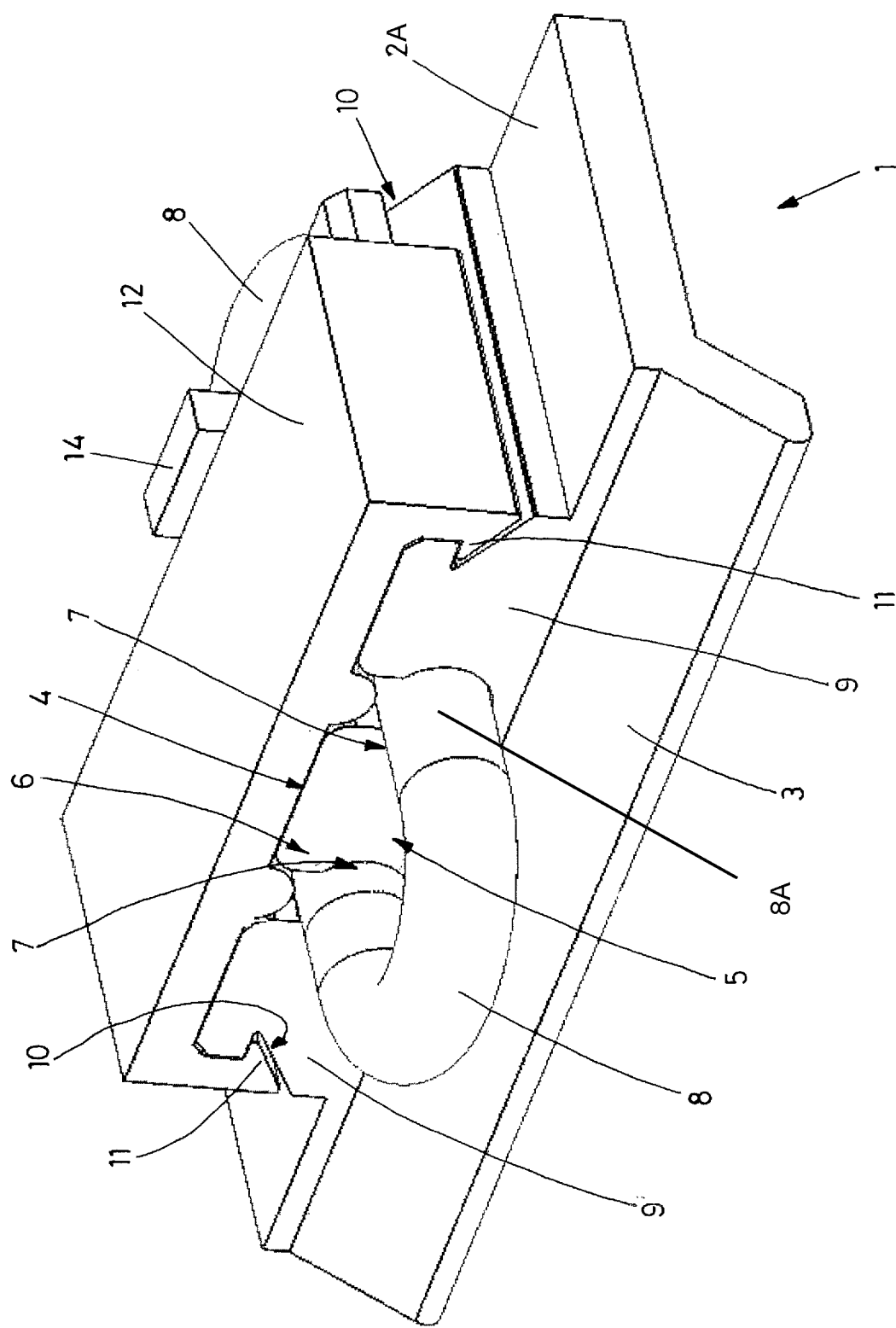
FIG. 1 is a perspective view of a chain link with a driver snapped onto the chain link and a locking bar secured to the driver by a slide connection.

FIG. 1 is a perspective view showing a feed chain (only a single chain link 8 of the chain is shown), a first embodiment of a driver 1, shown snapped onto the chain link 8, and a locking bar 12. The driver 1 has a molded body 2 that includes a base 2A, a pusher 3 that pushes the feed along a feed channel (not shown), and a snap connector 13 (best seen in FIGS. 2 and 3) that snaps the driver 1 onto the chain link 8. A mushroom-shaped protrusion 4 extends upright from the base 2A in the middle of the driver 1.

Figure 2:
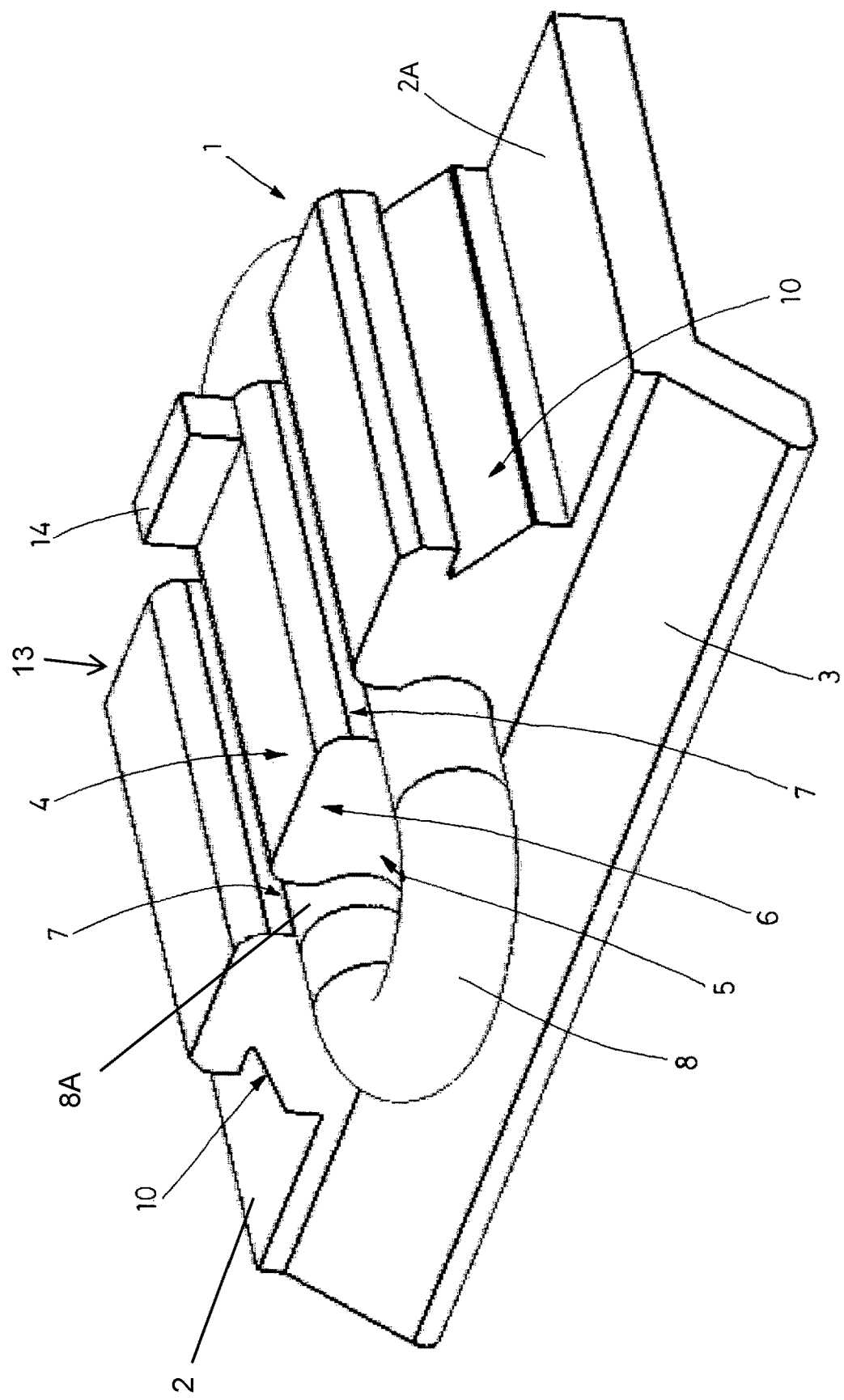
FIG. 2 is a perspective view of the chain link and the driver of FIG. 1, without the locking bar.
Figure 3:
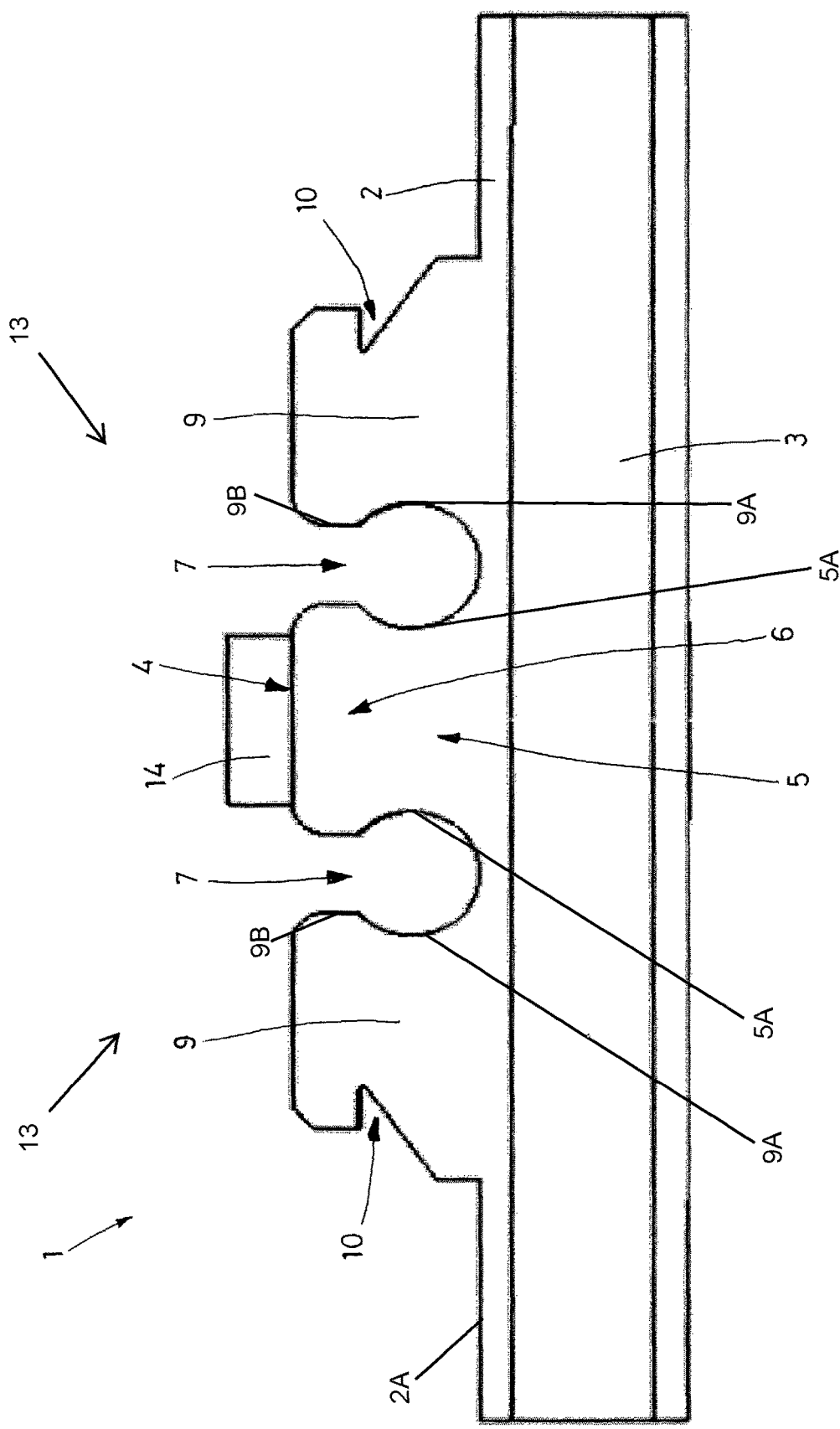
FIG. 3 is a front plane view of the driver.

FIGS. 2 and 3 show the driver 1 without the locking bar 12 and clearly illustrate the geometry of the snap connector 13. The snap connector 13 has two chain-link slots 7 that are formed above the base 2A of the body 2, the slots 7 bounded by two outer slot walls 9 and a central slot wall 5. The central slot wall 5 and the outer slot walls 9 have a lower portion 5A and 9A, respectively, that has a groove that runs front to back and an upper portion 6 and 9B, respectively, that is laterally wider than the lower portion, thereby forming an omega-shape in the slots 7. The central slot wall 5 can also be described as having a mushroom shape, the lower portion 5A being the stem and the upper portion 6 the umbrella-like top of the mushroom. This shape, together with the geometries of the outer slot walls 9, enables the snap-lock connection 13 to snap onto and stay on the chain link legs 8A, because the omega shape of the chain-link slots 7 encircles the round wire of the chain link leg 8A by more than 180 degrees, i.e., encircles the leg beyond its diameter at its horizontal center line, thereby requiring some force to be applied to the driver 1 to release it from the chain link 8

Also clearly shown in FIG. 2 is a groove 10 that is provided on each face of the two outer slot walls 9 that face away from the respective chain-link slot 7. This groove 10 serves to engage with a slide profile 11, shown in FIG. 1, on the locking bar 12 to secure the bar to the driver 1. Sliding the locking bar 12 onto the driver 1 and pushing it toward the rear of the driver locks the bar 12 in place. A stop 14 is provided on the driver 1 to limit the rearward travel of the locking bar 12. In the embodiment shown, the stop 14 is provided on a rear edge of the snap connector 13.

Figure 4:
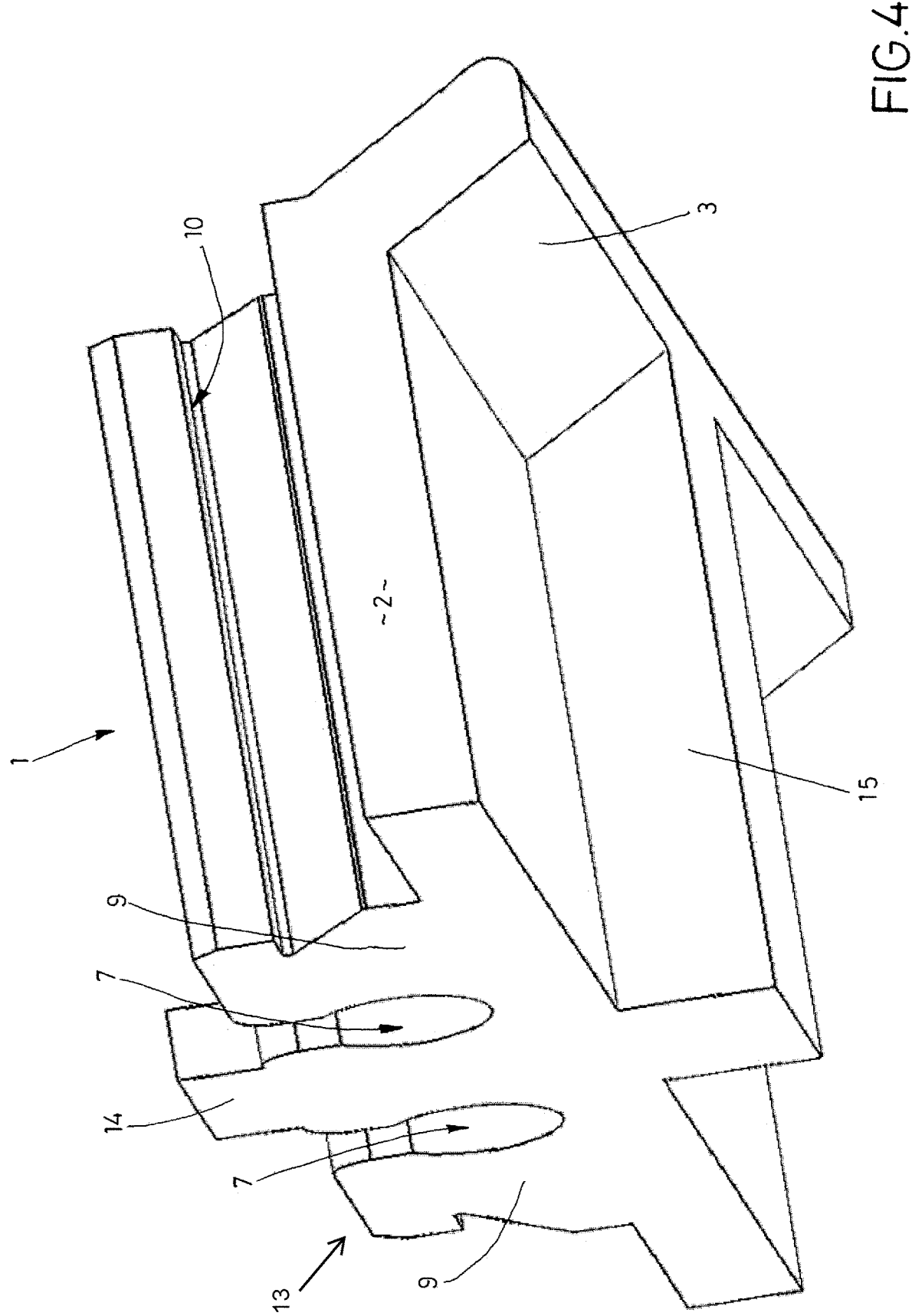
FIG. 4 is a bottom perspective view of the driver, showing a sliding web.

FIG. 4 is a bottom perspective view of the driver 1, looking toward the front where the pusher 3 extends downward so as to move feed along the feed channel. A support web 15 connects to the base 2 and the pusher 3 and is designed to slide along the floor or the feed channel.

Figure 5:
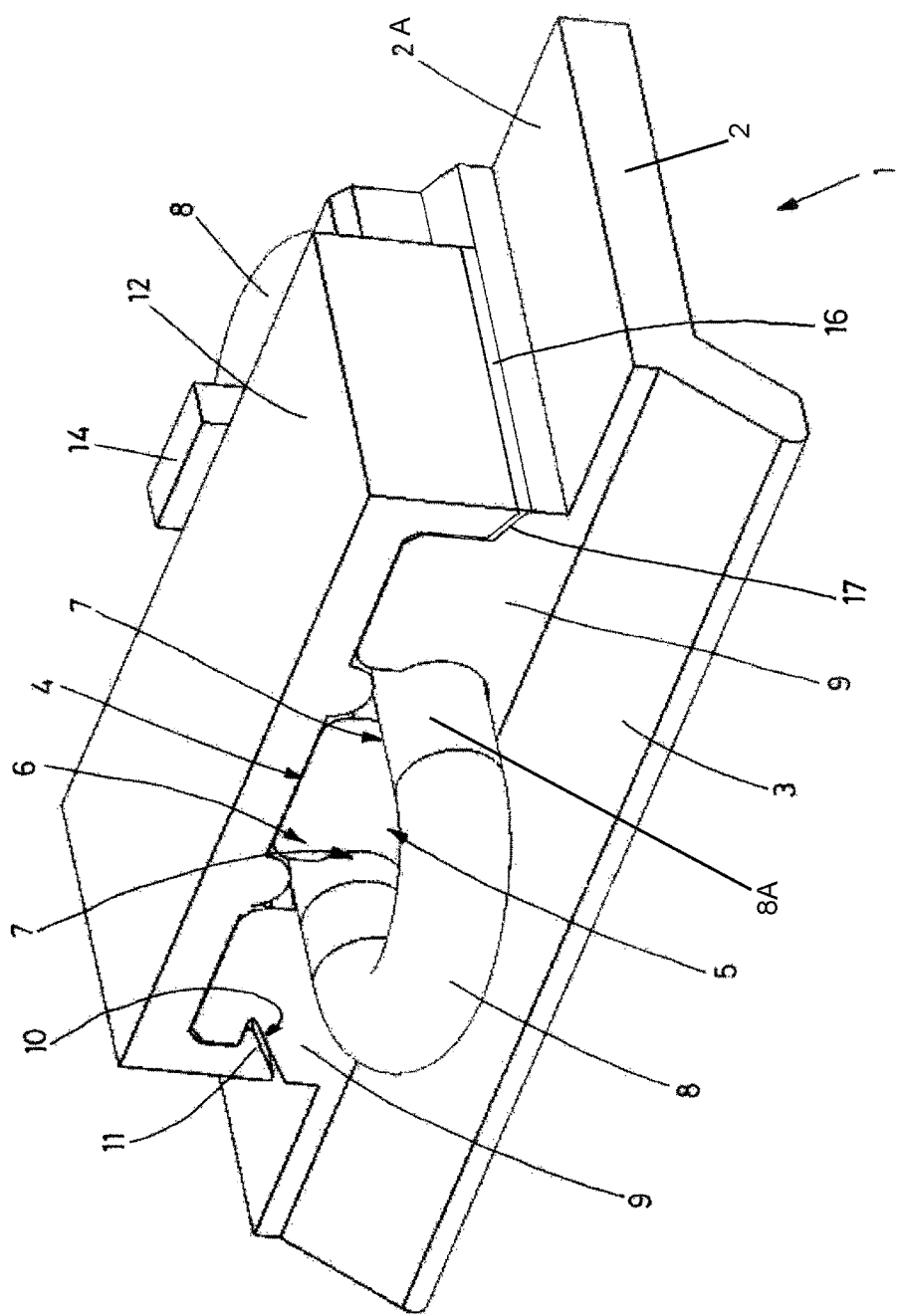
FIG. 5 is a perspective view similar of the chain link with driver and locking bar, showing a film hinge that attaches the locking bar to the driver.

FIG. 5 illustrates the driver 1 and the locking bar 12 described above, but here the driver 1 and the locking bar 12 are connected together by means of a film hinge or living hinge 16. The film hinge 16 is formed as a web of material between one of the slot walls 9 and one end of the locking bar 12. The slide groove 10 and the slide profile 11 are provided on the opposite slot wall 9 and the opposite end of the locking bar 12. Rather than sliding the locking bar 12 onto the driver 1 to lock the driver 1 onto the chain link 8, the locking bar 12 is pivoted about the hinge 16 to bring it into position above the driver 1 and the chain link 8 and is pressed downward, until the slide profile 11 snaps into the groove 10. FIG. 5 also shows a gap 17 between the locking bar 12 and the slot wall 9 in the area directly adjacent the film hinge 16. This gap 17 is a result of the height of the film hinge 16.

The stop 14 is also shown in this embodiment of FIG. 5, even though it might seem that it would not be needed, because the locking bar 12 is attached to the driver 1 by means the hinge 16. During operation, however, the feed in the feed channel presses the locking bar 12 rearward. The stop 14 prevents the locking bar 12 from being pushed undesirably far to the rear, which would otherwise cause undesirable deformation on the film hinge 16 and likely shorten its functional service life.

Notwithstanding the stop 14 shown in the drawings, it is also understood that it is possible to provide a stop at the rear of the slide groove 10, by providing a protrusion or end wall there, so that the groove is closed off at the rear end, effectively providing a stop.

As mentioned above, the driver 1 is a molded component. Ideally, both the driver 1 and the locking bar 12 are molded plastic components. If the film hinge 16 is used, then all three elements may be formed from the same plastic material.

It is understood that the embodiments described herein are merely illustrative of the present invention. Variations in the construction of the feed chain driver may be contemplated by one skilled in the art without limiting the intended scope of the invention herein disclosed and as defined by the following claims.

What is claimed is:

1. A driver for use on a chain link of a feed chain, the chain link having two chain link legs and two rounded ends, the driver comprising:
   a driver body;
   a snap connector formed on the driver body, the snap connector having two chain link slots that are formed between two outer slot walls and a central slot wall, the central slot wall being mushroom-shaped in that an upper portion of the central slot wall projects to each side that faces a respective one of the chain link slots, each chain-link slot dimensioned to accommodate one leg of the two chain link legs;
   wherein the driver body extends beyond the width and to each side of the chain link; and
   wherein the snap connector is elastic so as to be snappable onto the two chain link legs.

2. The driver of claim 1, wherein the driver body is made of a plastic material.

3. The driver of claim 1, further comprising:
   a locking bar that is assembled above the driver body over the snap connector, to prevent the chain link legs from inadvertently releasing from the snap connector.

4. The driver of claim 3, further comprising:
   a hinge that attaches a first end of the locking bar to the driver body; and
   an assembly lock that locks a second end of the locking bar to the driver body;
   wherein the assembly lock is a snap closure.

5. The driver of claim 4,
   wherein the driver body and the locking bar are both molded plastic components; and
   wherein the hinge is a film hinge made of the same plastic material used for the driver body and the locking bar.

6. The driver of claim 3, further comprising:
   an assembly lock that secures the locking bar to the driver body;
   wherein the assembly lock is a snap closure, the driver body and the locking bar having complementary geometries to form the snap closure.

7. The driver of claim 6,
wherein the driver body has a groove and the locking bar has a locking edge; and
wherein the locking edge slidably engages with the groove on the driver body to lock the locking bar to the driver body.

8. The driver of claim 7, wherein the assembly lock is provided at two locations spaced a distance from each other.

9. The driver of claim 3, further comprising:
a stop that is formed on the driver body;
wherein, when feed in the feed channel pushes against the locking bar, the pressure exerted thereby pushes the locking bar against the stop.

10. A feed chain comprising:
a plurality of chain links, each chain link having two chain link legs that extend between two rounded ends; and
a driver comprising a driver body that is a unitary component and a snap connector formed on the driver body having two chain link slots, each chain-link slot dimensioned to accommodate one leg of the two chain link legs, the two chain link slots formed between two outer slot walls and a central slot wall;
wherein the driver extends on both sides beyond the width of the chain link;
wherein the snap connector is elastic so as to be snappable onto the two chain link legs; and
wherein one or more of the drivers are fitted onto the feed chain.

11. The feed chain of claim 10, wherein the chain link slots have an omega shape that is dimensioned to encircle more than 180 degrees of a circumference of a respective chain link leg.

12. A driver for use on a chain link of a feed chain, the chain link having two chain link legs and two rounded ends, the driver comprising:
a driver body;
a snap connector formed on the driver body, the snap connector having two chain link slots that are formed between two outer slot walls and a central slot wall, the central slot wall having an upper portion that extends outward to each side, so as to extend over a portion of an upper end of each chain link slot, each chain-link slot dimensioned to accommodate one leg of the two chain link legs;
wherein the snap connector is elastic so as to be snappable onto the two chain link legs; and
wherein the driver body extends beyond the width and to each side of the chain link.

13. The driver of claim 12, wherein the two outer slot walls and the central slot wall are shaped so as to provide an omega-shaped opening on each of the two chain link slots, the omega-shaped opening encircling more than one-half of a circumference of a respective one of the two chain link legs.

* * * * *